United States Patent
Hanel et al.

(10) Patent No.: US 10,313,574 B2
(45) Date of Patent: Jun. 4, 2019

(54) DEVICE AND METHOD FOR RECOGNIZING INSCRIPTIONS ON VEHICLE TIRES

(71) Applicant: Beissbarth GmbH, Munich (DE)

(72) Inventors: Christian Hanel, Leonberg (DE);
Volker Uffenkamp, Ludwigsburg (DE);
Michael Klar, Bad Friedrichshall (DE);
Guenter Nobis, Nuertingen (DE)

(73) Assignee: Beissbarth GmbH, Munich (DE)

( * ) Notice: Subject to any disclaimer, the term of this patent is extended or adjusted under 35 U.S.C. 154(b) by 162 days.

(21) Appl. No.: 14/784,160

(22) PCT Filed: Feb. 27, 2014

(86) PCT No.: PCT/EP2014/053809
§ 371 (c)(1),
(2) Date: Jan. 15, 2016

(87) PCT Pub. No.: WO2014/173564
PCT Pub. Date: Oct. 30, 2014

(65) Prior Publication Data
US 2016/0127625 A1    May 5, 2016

(30) Foreign Application Priority Data
Apr. 23, 2013   (DE) .................. 10 2013 207 374

(51) Int. Cl.
*G06K 9/32*  (2006.01)
*H04N 5/232*  (2006.01)
(Continued)

(52) U.S. Cl.
CPC ......... *H04N 5/232* (2013.01); *G06K 9/00442* (2013.01); *G06K 9/209* (2013.01);
(Continued)

(58) Field of Classification Search
None
See application file for complete search history.

(56) References Cited

U.S. PATENT DOCUMENTS 4,700,078 A * 10/1987 Mizuno ............... G06K 7/1092
235/454
4,745,469 A *  5/1988 Waldecker ......... G01B 11/2755
29/273
(Continued)

FOREIGN PATENT DOCUMENTS

CN      102248870      11/2011
DE      24 47 480      4/1975
(Continued)

OTHER PUBLICATIONS

Chinese Office Action dated Jan. 17, 2018, issued in Chinese Application No. 201480022823.2, filing date Feb. 27, 2014.
(Continued)

*Primary Examiner* — Jayesh A Patel
(74) *Attorney, Agent, or Firm* — Norton Rose Fulbright US LLP; Gerard A. Messina

(57) ABSTRACT

A device for recognizing the inscription on the wall of a tire, including a driving surface plane, at least one directional light source to illuminate the tire; at least one camera to record multiple images of a wall of the tire rolling on the driving surface plane; and an evaluation device to synthesize an image of the wall of the tire from the multiple recorded images and to evaluate the synthesized image with the aid of a text recognition method.

9 Claims, 7 Drawing Sheets

(51) Int. Cl.
*G06K 9/20* (2006.01)
*G06K 9/00* (2006.01)
*G06K 9/46* (2006.01)
*G06T 7/20* (2017.01)
*H04N 5/265* (2006.01)
*H04N 7/18* (2006.01)
*G06T 7/73* (2017.01)

(52) U.S. Cl.
CPC .................. *G06K 9/46* (2013.01); *G06T 7/20* (2013.01); *G06T 7/73* (2017.01); *H04N 5/265* (2013.01); *H04N 7/18* (2013.01); *G06K 2009/4666* (2013.01); *G06T 2207/30252* (2013.01)

(56) References Cited

U.S. PATENT DOCUMENTS

| | | | | |
|---|---|---|---|---|
| 5,687,249 | A * | 11/1997 | Kato | G08G 1/017 340/936 |
| 6,237,234 | B1 * | 5/2001 | Jackson | G01B 11/08 33/203 |
| 6,735,337 | B2 | 5/2004 | Lee et al. | |
| 6,856,697 | B2 | 2/2005 | Lee et al. | |
| 7,295,948 | B2 | 11/2007 | Jetter | |
| 7,343,789 | B2 * | 3/2008 | Fujisawa | G01B 11/25 73/146 |
| 8,284,251 | B2 * | 10/2012 | Suita | G01M 17/02 280/79.4 |
| 8,498,467 | B2 * | 7/2013 | Joly | G06T 7/33 382/141 |
| 9,097,514 | B2 * | 8/2015 | Takahashi | G01B 11/0608 |
| 2004/0101166 | A1 * | 5/2004 | Williams | G01P 3/38 382/104 |
| 2008/0256815 | A1 * | 10/2008 | Schafer | B60C 11/24 33/739 |
| 2009/0080703 | A1 * | 3/2009 | Hammerschmidt | G06T 7/0004 382/104 |
| 2009/0102922 | A1 * | 4/2009 | Ito | H04N 7/181 348/148 |
| 2009/0174777 | A1 * | 7/2009 | Smith | G08G 1/052 348/149 |
| 2011/0267460 | A1 * | 11/2011 | Wang | G08G 1/054 348/135 |
| 2012/0206602 | A1 * | 8/2012 | Clucas | G06T 7/246 348/149 |
| 2013/0021471 | A1 * | 1/2013 | Waterhouse | F24S 50/20 348/139 |

FOREIGN PATENT DOCUMENTS

| | | |
|---|---|---|
| DE | 10 2008 0223 936 | 8/2008 |
| EP | 0 24 0078 | 10/1987 |
| EP | 0 294 530 | 12/1988 |
| EP | 816 799 | 1/1998 |
| EP | 1 332 334 | 8/2003 |
| JP | 2003 12 1111 | 4/2003 |
| WO | WO 961 07 27 | 4/1996 |
| WO | WO 97 07 380 | 2/1997 |
| WO | WO 03 02 36 99 | 3/2003 |
| WO | 2009/075539 A2 | 6/2009 |

OTHER PUBLICATIONS

Chinese Office Action dated Sep. 26, 2018, issued in Chinese Application No. 201480022823.2, filing date Feb. 27, 2014.
Search Report dated Dec. 15, 2017, issued in Chinese Application No. 201480022823.2, filing date Feb. 27, 2014.

* cited by examiner

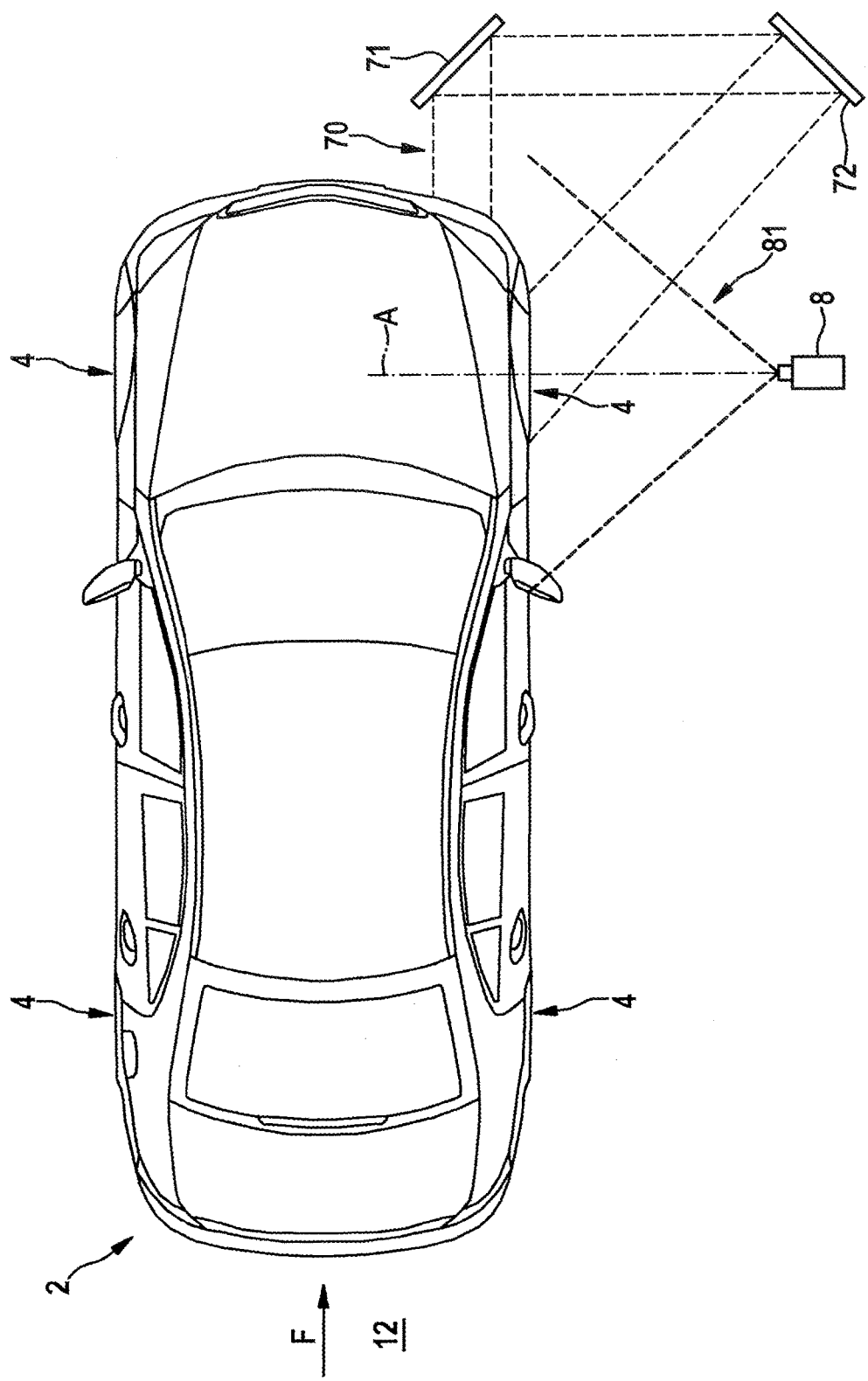

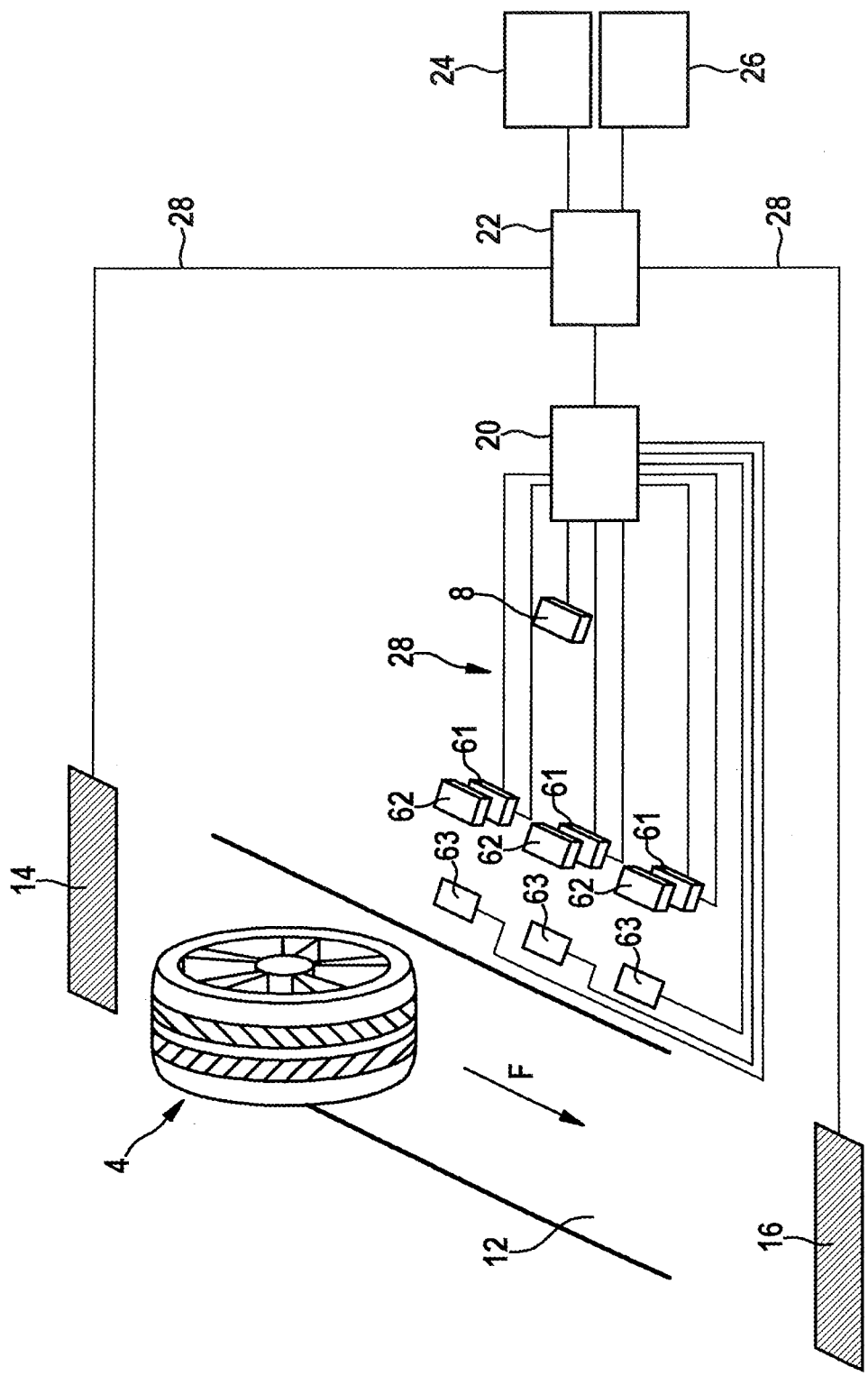

DEVICE AND METHOD FOR RECOGNIZING INSCRIPTIONS ON VEHICLE TIRES

FIELD OF THE INVENTION

The present invention relates to a method for recognizing inscriptions on vehicle tires, in particular on tires of motor vehicles, and to a device which is configured for carrying out a method according to the present invention.

BACKGROUND INFORMATION

Inscriptions applied to the sidewalls (tire walls) of tires often contain information of relevance for repair shops, testing organizations, gas stations and/or operators of vehicle fleets but also for tire manufacturers and tire dealers. By automatic recognition of inscriptions, valuable working time may be saved and workflow may be made more efficient.

A number of methods and devices, in particular imaging optical methods, are known for automatic recognition of inscriptions on tire walls, which may include numerals, letters and symbols. One problem is that the inscription on tire walls is usually made up of black characters on a black background, the characters being differentiable from the surface of the side wall only due to an elevation or an impression as a relief inscription. This results in a low visual contrast between the inscription and the background. Automatic recognition of the inscription by two-dimensional imaging methods is therefore difficult.

Various methods have been provided for improving the contrast: in EP 0 240 078 B1 and EP 0 294 530, the shadow casting of the relief inscription created by a directional illumination is utilized. Patent document DE 24 47 480 discusses how differences in intensity between reflected light and diffusely scattered light permit a character recognition.

U.S. Pat. Nos. 6,735,337 B2 and 6,856,697 B2 provide using the correlation with multiple partial pattern templates per character for character recognition, from which the probability of the character having been recognized correctly is derived, although perhaps not all edges of the character are visible.

A number of other approaches avoid the problem of the contrast in two-dimensional methods by using 3D methods, in particular light section methods using laser lines. Patent documents EP 1 332 334 B2, WO 03/023699 A1, DE 10 2008 023 936 A1 and U.S. Pat. No. 7,295,948 B2 discuss the segmentation and recognition of characters based on a 3D point cloud which is generated with the aid of a laser scanner in a light section method.

All the methods believed to be understood so far have in common the fact that the tire must be dismounted and rotated in a special device beneath the detection unit. These methods are therefore associated with a high labor and equipment cost.

Character recognition of inscriptions on tire walls of passing vehicles is mentioned in WO 96/10727. Patent document WO 97/07380 discusses a system which uses a 3D light section method to recognize deformations in the tire walls as they pass by. A similar procedure is discussed in EP 0 816 799. For data acquisition of a complete tire wall here, the wheel must be dismounted or the vehicle must be standing on a roller type test stand or the recording system must be mounted on the vehicle, so that it moves with the vehicle.

SUMMARY OF THE INVENTION

One object of the present invention is to provide a device and a method for reliable recognition of inscriptions on vehicle tires, in which the tires may remain mounted on the vehicle during the recognition process.

A method according to the present invention for recognizing an inscription applied to the wall of a vehicle tire includes illuminating the vehicle tire with at least one light source in a directional manner while the vehicle is driving past at least one camera, and multiple images of the tire rolling by the camera are recorded by the camera. An image of the wall of the tire is synthesized from the multiple recorded images, and the synthesized image is evaluated with the aid of a text recognition method (OCR method) to recognize the inscription applied to the wall of the tire.

A device according to the present invention for recognizing the inscription on a vehicle tire includes a driving surface plane, at least one light source, which is configured to illuminate the vehicle tire directionally, at least one camera, which is configured to record multiple images of a tire rolling on the driving surface plane, and an evaluation device, which is configured to synthesize an image of the wall of the vehicle tire from the multiple images recorded by the camera and to evaluate the synthesized image with the aid of a text recognition method.

The present invention describes an approach with which a robust automatic tire identification may be carried out, while the tire is passing by, without complex and expensive-to-implement systems. In particular the present invention avoids various disadvantages of traditional approaches, such as, for example, complex mechanical structures, moving mechanical elements which are susceptible to problems, the amount of time required for mounting and dismounting the tires and/or high investment costs for a complex measuring technology and/or additional required components, such as a roller type test stand, for example.

The present invention may be used in conjunction with traditional 2D images as well as 3D images recorded using a 3D camera.

In one specific embodiment, the synthesizing of an image of the wall of the vehicle tire includes determining algorithmically the movement of local areas of the tire wall between two images. Such an algorithmic determination makes it possible to calculate all the images of the image sequence back to one central image and to assemble them to form a single image.

In one specific embodiment, multiple light sources are situated in a line along the rolling direction of the tire. Such an arrangement makes it possible to illuminate the tire sufficiently well during its entire pass at the camera.

In one specific embodiment, multiple light sources are situated at different distances or heights above the driving surface plane. Such an arrangement makes it possible to illuminate various tires of different diameters well.

In one specific embodiment, multiple light sources are implemented in various positions across the rolling direction of the tire. This permits good illumination of the tires of vehicles having different track gauges.

In one specific embodiment, each light source has individually controllable illumination elements. By individual control of the individual illumination elements, the illumination is readily adaptable to the prevailing (ambient) lighting conditions.

In one specific embodiment, the light sources are configured in such a way that they illuminate the tire using light of different wavelengths. It is possible in this way to illuminate the tire from at least two different directions simultaneously using light of different wavelengths (for example, red and blue light). The individual color channels for each recorded image are then separated. Since the tire has been illuminated with light of the first wavelength from a different direction of illumination than with light of the second wavelength, the number of views of the tire wall available for image synthesizing is increased in this way.

The illumination devices may contain infrared LEDs. Infrared LEDs are a particularly suitable illumination arrangement since they do not emit visible light and therefore do not irritate the driver of the vehicle.

The illumination devices may be operated in flash mode, so that its light intensity may be increased even further.

Alternatively or additionally, a mirror arrangement may be provided, making it possible to deflect sunlight and/or light from the headlights of the motor vehicle onto the tires in order to use natural sunlight and/or the headlights of the vehicle as a light source for illumination of the tires. Natural sunlight and the headlights of the vehicle provide an inexpensive and very suitable light source for illumination of the tires. In particular the high beams of a vehicle are an intense light source, which emits approximately parallel beams of light.

Exemplary embodiments of the present invention are explained in greater detail below on the basis of the accompanying figures.

BRIEF DESCRIPTION OF THE DRAWINGS

FIG. 4 shows a deflecting lens, including multiple mirrors for illumination of a tire wall.

FIG. 5 shows one exemplary embodiment of a device for recognizing tire inscriptions.

DETAILED DESCRIPTION

Figure 1:
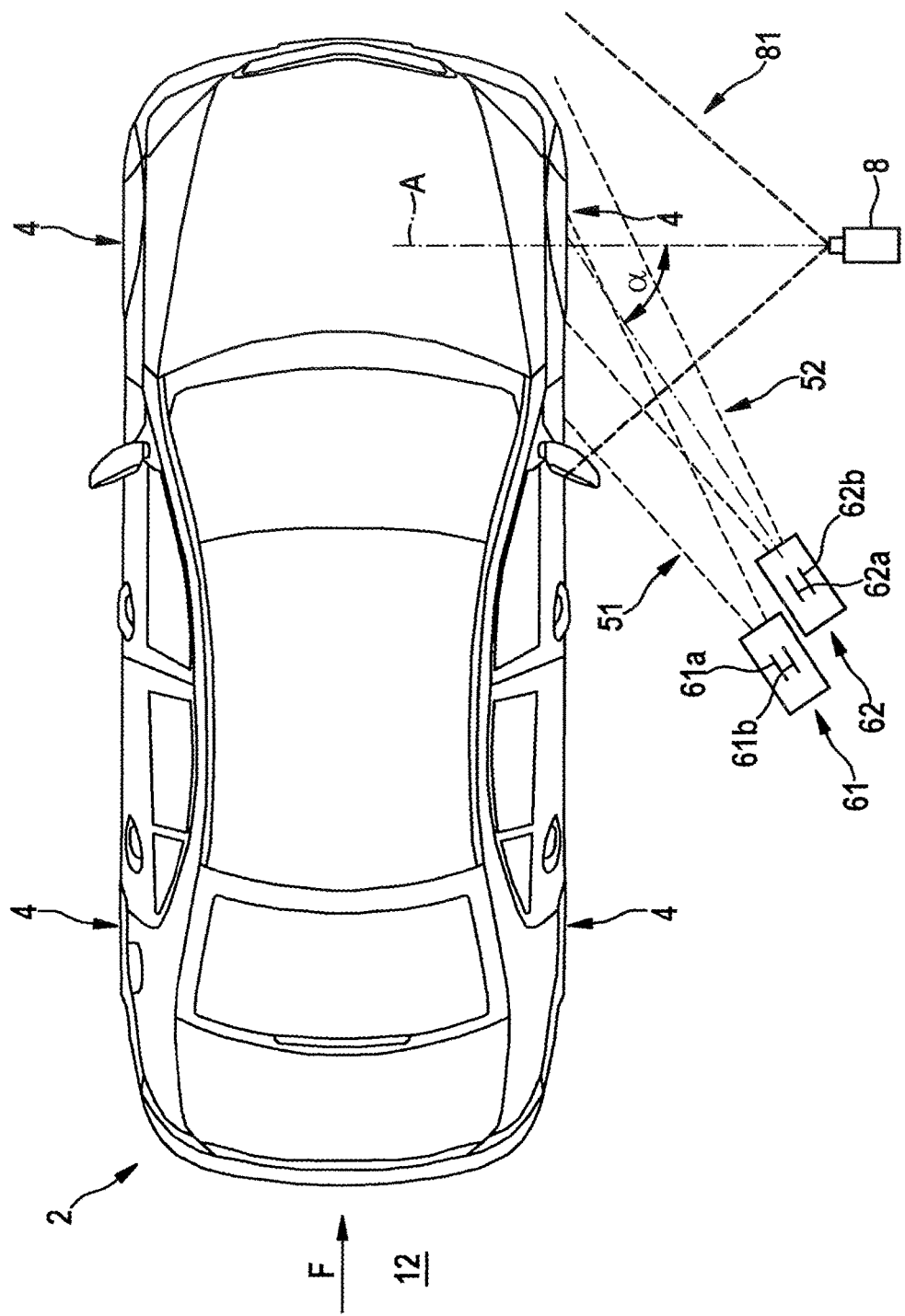
FIG. 1 shows the configuration of one exemplary embodiment of a device for recognizing the inscription on a vehicle tire, in a top view.

FIG. 1 shows the configuration of one exemplary embodiment of a device for recognizing inscriptions on a vehicle tire 4 in a top view.

For character recognition, a vehicle 2 drives by the device from left to right in driving direction F on a driving surface plane 12. While vehicle 2 is passing by, an image sequence which includes multiple images of the lower part of vehicle 2, in particular its wheels or tires 4, is recorded using at least one video camera 8.

For illumination of tires 4, two directional light sources 61, 62 are used in the exemplary embodiment shown in FIG. 1, these light sources being set up at the side and offset relative to video camera 8, and tires 4 being illuminated, each with approximately parallel light beams 51, 52 at what may be a large angle α (<90 degrees) to optical axis A of camera 8. Camera 8 and light sources 61, 62 are installed in stationary positions and do not move while the image sequence is being recorded. Light sources 61, 62 each have two separately controllable illumination elements 61a, 61b, 62a, 62b. The number of two light sources 61, 62 each having two separately controllable illumination elements 61a, 61b, 62a, 62b, is given only as an example. In particular, more than two light sources 61, 62, each having more or less than two separately controllable illumination elements 61a, 61b, 62a, 62b, may also be used.

Since tire 4 is rolling on driving surface plane 12, while the image sequence is being recorded and there is a different relative orientation between tire 4 and light sources 61, 62 and the camera in each image, the wall of tire 4 is represented in a different view in each individual image of the image sequence. In particular, the edges of the inscription running perpendicularly to the direction of optical axis A of camera 8 in the instantaneous image are represented with a particularly high contrast due to a shadow being cast. For robust character recognition, however, all edges of the inscription should be represented with a high contrast in a single image, regardless of their direction relative to light sources 61, 62.

Figure 2:
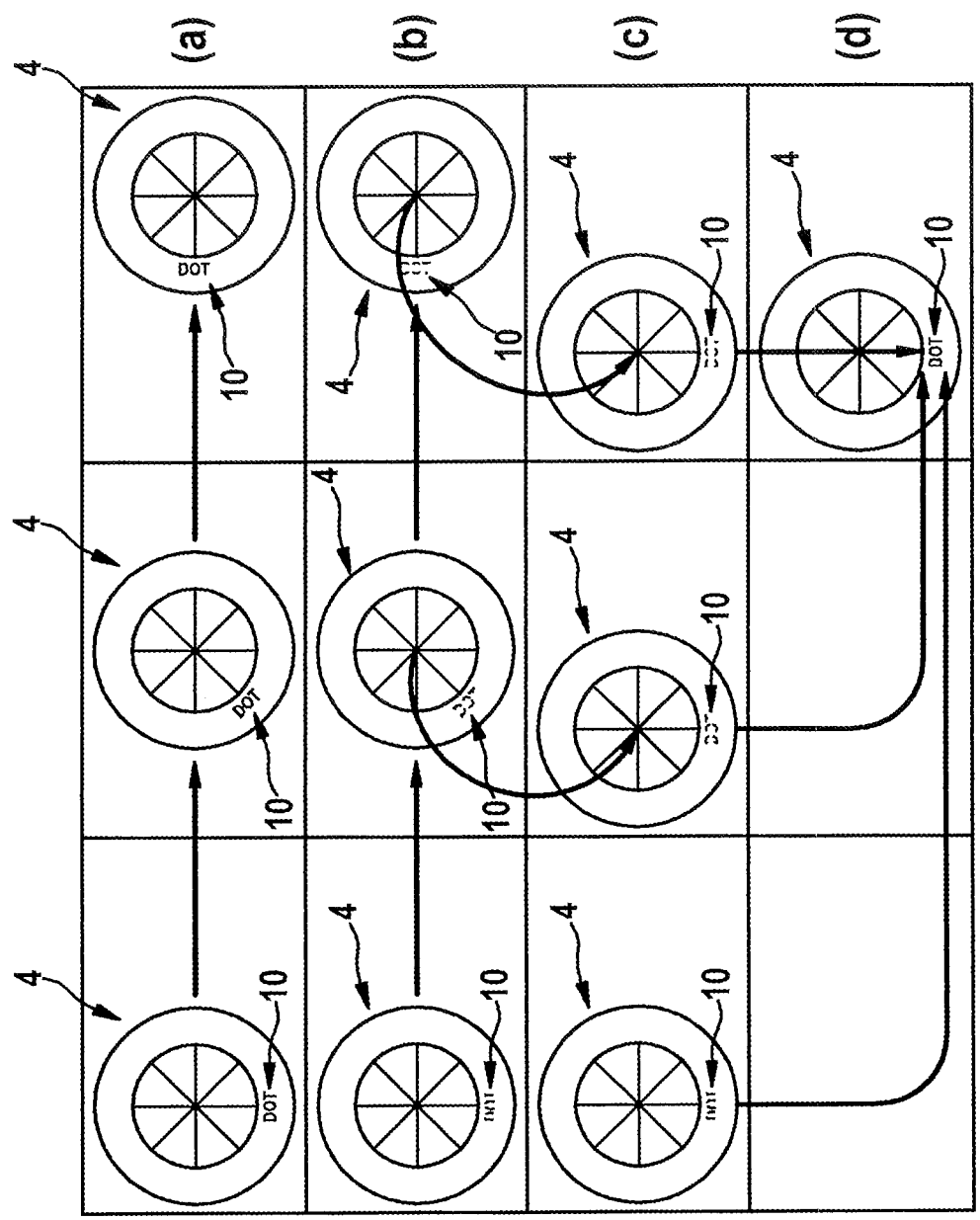
FIG. 2 shows the creation of a single image including high-contrast images of all edges by an image sequence analysis.

The principle according to the present invention for creating a single image with high-contrast representation of all edges with the aid of an image sequence analysis is schematically shown in FIG. 2.

Field of vision 81 and the image rate of camera 8 are configured in such a way that the recorded image sequence includes at least one quarter revolution of tire 4.

FIG. 2 shows as an example a quarter revolution of tire 4 in three images, inscription 10 on the side wall of tire 4 facing camera 8 being reduced to the three letters "DOT." The first row (a) shows the particular position of tire 4 in the three images; the second row (b) shows the particular camera images.

In the first camera image shown at the left, it is indicated schematically that the perpendicular edges of inscription 10 are represented with a particularly high contrast in this position of tire 4. In the third camera image shown at the right, tire 4 has moved further, and in the process has rotated by 90 degrees, so that the edges of inscription 10 running horizontally in the first camera image, now running perpendicularly after rotation of tire 4, are represented with a particularly high contrast.

A reliable and robust automatic recognition of inscription 10 requires a single image, in which all edges are represented with a high contrast, regardless of their direction. Such an image may be created using known methods of digital image sequence analysis, in which the creation of the image includes the following steps:

In the first step, the individual images are prepared by image preprocessing, which includes, on the one hand, radiometric corrections, for example, a standardization of the illumination, which equalizes the large-area inhomogeneities in the illumination intensity. In addition, geometric corrections are made, for example, correction of the distortions in the imaging.

In a second step, the images are recorded with the aid of a model-based motion compensation. Individual points on tire 4 move along a cycloid during the rolling operation. Using this model knowledge, movement of local image areas between two arbitrary images of the image sequence may be determined using an algorithm. Various image processing methods may be used for this purpose, for example, a standardized cross-correlation of the gray-scale values of local image areas, a least-squares matching of the gray-scale values of local image areas or optical flow methods. As a result, the parameters of the corresponding cycloid movement are obtained for each image area. With the aid of these parameters, it is now possible to calculate all images of the image sequence back to an arbitrarily selected central image, for example, the first image of the sequence.

This procedure is indicated by the arrows between the images in the second row (b) and the images in the third row (c) in FIG. 2. After the back-calculation described above, there is a new image sequence in the third row (c), in which the points on the tire wall recorded from different directions of illumination have the same pixel coordinates in all images.

From the evaluation of the image sequence just described, the position of tire 4 in each image, the rolling radius, the driving speed and, by triangulation of corresponding pixels, the distance of vehicle 2 from camera 8 are obtained as additional information. The information about driving speed may be used to increase the robustness of the method. If the driving speed exceeds a predefined limiting value, beyond which a reasonable evaluation of the measuring results is no longer possible, the measurement may be terminated and classified as invalid with a corresponding report.

Finally, in a third step, the motion-compensated images shown in row (c) are fused to yield a result image, which is shown in row (d), in which all edges of inscription 10 are represented with a high contrast. Various approaches are possible in this regard, for example, a pixel-by-pixel minimum formation to fuse the shadows in one image or a pixel-by-pixel maximum formation of local image gradients.

Following the digital image sequence analysis described here, there is automatic recognition of inscription 10 in the result image (d) with the aid of known text recognition methods. Information important for the operators of the measuring system is extracted and transformed into a text data format suitable for further processing.

Illumination of tires 4 is a critical element of the measuring arrangement due to the movement of vehicle 2 during the measuring operation, possibly changing lighting conditions of the surroundings and/or different geometric conditions (e.g., wheel diameter, track gauge) of various types of vehicles.

For this reason, several possibilities for the arrangement and control of light sources 61, 62 are presented below and may be used individually or in combination to optimize the lighting situation individually for each tire 4 of vehicle 2.

Figure 3:
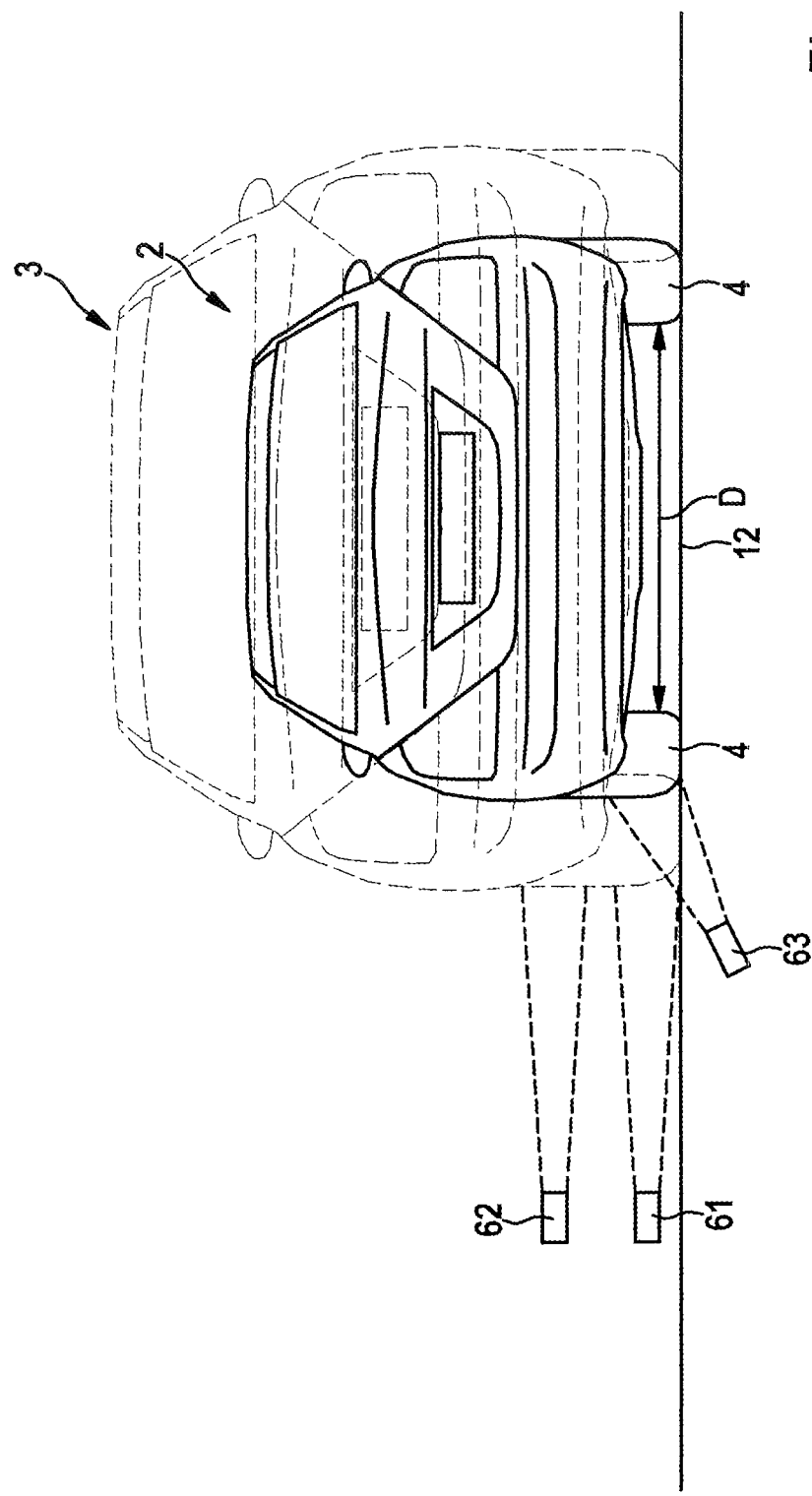
FIG. 3 shows an example of a possible arrangement of multiple light sources.

FIG. 3 shows an example of one possible arrangement of light sources 61, 62, 63 for a large vehicle 3 and a small vehicle 2, the viewing direction being parallel to driving direction F and the rolling direction of tires 4. To be able to compensate for different tire diameters, light source 61 is supplemented by an additional light source 62 mounted further above driving surface plane 12. For compensation of different track gauges, a light source 63 sunk into driving surface plane 12 may be activated for smaller vehicles 2.

To optimize the illumination conditions in the course of recording the image sequence, targeted activation of various light sources 61, 62, 63 is possible, for example:

activating and deactivating different light sources 61, 62, 63 along driving direction F, depending on the instantaneous position of tire 4 relative to respective light source 61, 62, 63;

controlling the illumination intensity of each light source 61, 62, 63 and their illumination elements 61a, 61b, 62a, 62b;

activating additional light sources 61, 62 above driving surface plane 12 in the case of tires 4 having a large diameter;

activating light sources 63 sunk into driving surface plane 12 for optimal detection of vehicles 2 having a small track gauge D.

The high beam of a motor vehicle 2 is an intense light source emitting approximately parallel beams of light, which may be used for illumination of the tire wall. FIG. 4 shows a deflecting lens of multiple mirrors 71, 72, which are configured and positioned to deflect beams of light 70 of the high beam of a headlight of vehicle 2 onto the wall of tire 4 facing camera 8 and thus to utilize the headlights of vehicle 2 as a light source. Alternatively or additionally, incident sunlight may also be used as the light source when the position of the sun is suitable.

FIG. 5 schematically shows an exemplary embodiment of a device for recognizing tire inscriptions using a camera 8 and an arrangement of light sources 61, 62, 63, which are situated along a line in driving direction F, over or in a driving surface plane 12 of a vehicle tire 4. At least two of the arrangements shown in FIG. 5, one for each side of vehicle 2, belong to a complete test system.

Light sources 61, 62, 63 and camera 8 of the arrangement are connected by electric lines 28 or wirelessly to a control computer 20. A higher-level server/computer 22 is connected to control computer 20 and to a display unit 24, a work station computer 26, a system for tire pressure monitoring 14 and/or a system for vehicle identification 16. An energy source (not shown) supplies the energy required for operation.

Higher-level computer/server 22 is able to handle a plurality of tests in conjunction with other systems, in particular
an assignment of the results of analysis of the device for tire identification to a vehicle 2 identified by a system for vehicle identification;
ascertaining tire-specific setpoint values for tires 4 identified from a tire database and carrying out an additional evaluation of the rolling radii ascertained for each tire 4;
transfer of tire-specific setpoint values to other connected test systems, for example, for measurement of profile depth or for monitoring of tire pressure for an expanded interpretation and analysis of the measuring results for improving the diagnostic quality;
an assignment of the diagnostic results of all test instruments connected to server 22 to corresponding vehicle 2;
display of at least a portion of the diagnostic results on a display unit 24, which may be seen by the driver of vehicle 2 tested shortly before;
supplying all or specific results ascertained by the test system regarding particular vehicle 2 at stationary or mobile workstation computers, for example, in the receiving area of a repair shop as basic information during the conversation with customers or in the service center of a shipping company for planning the next service schedule; also, additional fields of use for vehicle fleet operators, testing organizations, tire dealers, tire manufacturers, automobile manufacturers and others are conceivable; and
carrying out additional required working steps for marketing the vehicle-based diagnostic results to various customer groups.

Figure 6A:
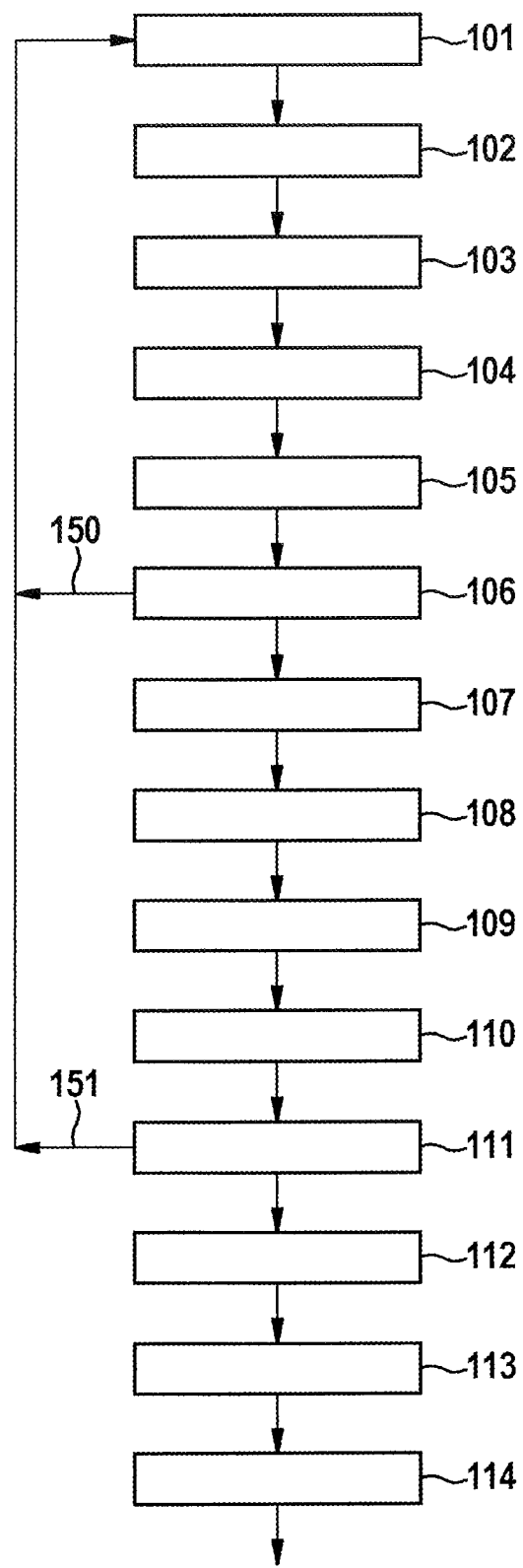
FIGS. 6a and 6b show flow charts of a method according to the present invention for recognizing tire inscriptions.
Figure 6B:
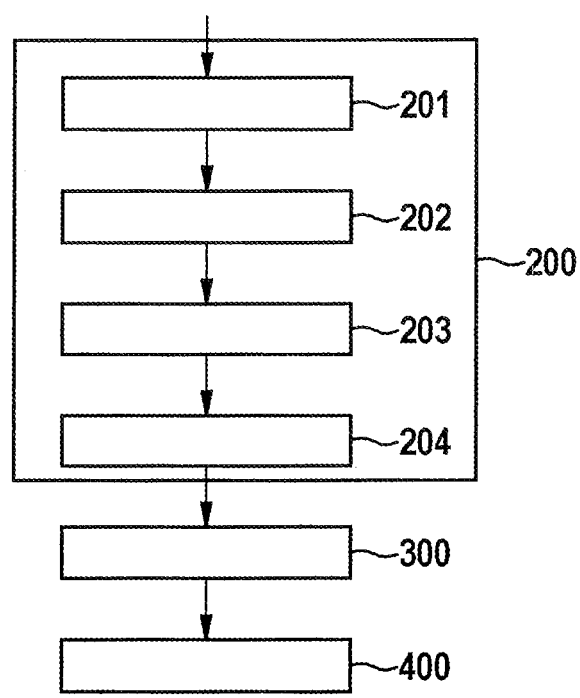

FIGS. 6a and 6b show flow charts, which describe a method according to the present invention for recognizing tire inscriptions:

In the first step 101, a vehicle 2 approaches the measuring system and triggers a trigger signal. The trigger signal starts a continuous image recording using predefined control data (step 102) on both sides of the vehicle.

There follows a continuous identification of the front wheel in the images, an analysis of the contrast conditions in the border area of tire 4 and an optimization of the illumination intensity (step 103).

There is a check of whether more than 50% of tire 4 has been represented in the camera image. If so, the images are saved as an image sequence for the front wheel while at the same time there is a further optimization of the illumination intensity (step 104).

In step 105 there is an analysis of the first two images of the image sequence, ascertaining the driving speed, the position and the rolling radius of tire 4 as well as the contrast conditions in the border area of tire 4.

An average value of the driving speed ascertained is compared with a predefined limiting value (step 106). If the average value of the driving speed exceeds the predefined limiting value, the measurement is terminated and must be repeated (step 150).

Light sources 61 for each front wheel 4 are activated along driving direction F; additional light sources 62, 63 above and/or below driving surface plane 12 are also activated if necessary (step 107).

The image sequence for the front wheel 4 is terminated when it has moved so far that it is less than 50% represented in the camera image. The continuous image recording is continued in step 107 without any change in the lighting control.

The continuous identification of tire 4 of the rear wheel in the recorded images, the analysis of the contrast conditions in the border area of tire 4 and a corresponding optimization of the illumination take place in step 108.

In step 109, there is a check of whether more than 50% of tire 4 is represented in the camera image. If this is the case, the recorded images are saved as an image sequence for tire 4 of the rear wheel while the illumination intensity is further optimized continuously.

The first two images of the image sequence are analyzed; the driving speed, the position and the rolling radius of tire 4 as well as the contrast conditions in the border area of tire 4 are ascertained (step 110).

In step 111, an average value of the driving speed ascertained is compared with a predefined limiting value. If the limiting value is exceeded, the measurement is terminated and must be repeated (step 151).

The optimum activation of light sources 61 for each rear wheel 4 along driving direction F, if necessary, also the activation of additional light sources 62, 63 above and/or below driving surface plane 12 take place (step 112).

The image sequence for the rear wheel is terminated (step 113) when the latter is less than 50% represented in the camera image. The image recording is stopped (step 114) and the image sequence analysis (step 200) is started separately for each tire 4.

Image sequence analysis 200 includes: in a first step 201, image preprocessing for each individual image, for example, with radiometric and geometric correction methods. In a second step 202, image recording with the aid of model-based motion compensation, calculating back all individual images to the position of the reference image and ascertaining the vehicle speed and the rolling radius of tire 4 and in a third step 203 the fusion of the motion-compensated individual images to form a result image (image fusion).

Automatic analysis of inscription 10 of tire 4 in the result images may be carried out after the end of the image sequence analysis (step 204) in step 300 for each tire 4 with the aid of known text recognition methods (OCR methods).

Finally, in step 400, tire inscription 10 of each tire 4 recognized is transferred in a text format to higher-level computer/server 22 for supplying in an IT system, for example, to workstation computers in an office (for example, in vehicle reception) or a repair shop or for further processing, for example, assignment to vehicle 2 identified using another measuring system and/or for ascertaining setpoint data from a tire database, for example, for connected systems for tire or vehicle diagnosis.

What is claimed is:

1. A device for recognizing an inscription on a tire of a vehicle, comprising;
    a driving surface plane;
    at least one directional light source to illuminate the tire;
    at least one camera to record an image sequence comprising multiple images of a wall of a tire rolling on the driving surface plane; and
    a synthesizer configured to determine movement of local image areas between two arbitrary images of the image sequence using an algorithm and the knowledge that individual points on the wall of the tire move along a cycloid during the rolling thereby obtaining parameters of the corresponding cycloid movement for each image area; and to synthesize, based on said parameters, a central image of the wall of the tire, in which all edges of the inscription are represented with high contrast, from the images of the image sequence, and to evaluate the synthesized central image with the aid of a text recognition method.

2. The device of claim 1, wherein multiple light sources are situated in a line along the rolling direction of the tire.

3. The device of claim 1, wherein multiple light sources are in different vertical distances from the driving surface plane.

4. The device of claim 1, wherein multiple light sources are in various positions across the rolling direction of the tire.

5. The device of claim 1, wherein at least one of the at least one directional light sources has separately controllable lighting elements.

6. The device of claim 1, wherein multiple light sources are configured to illuminate the tire with light of different wavelengths.

7. The device of claim 1, wherein at least one of the at least one directional light sources is operable in a flash mode.

8. The device of claim 1, further comprising:
    a mirror arrangement to deflect natural sunlight and/or light of at least one headlight of the vehicle onto the wall of at least one tire.

9. A method for recognizing an inscription on a wall of a tire, the method comprising:
    illuminating the tire with at least one directional light source;
    recording an image sequence comprising multiple images of the wall of the tire rolling as it passes by at least one camera;
    determining movement of local image areas between two arbitrary images of the image sequence using an algorithm and the knowledge that individual points on the wall of the tire move along a cycloid during the rolling thereby obtaining parameters of the corresponding cycloid movement for each image area;
    synthesizing, based on said parameters, a central image of the wall of the tire, in which all edges of the inscription are represented with high contrast, from the images of the image sequence; and evaluating the synthesized central image with the aid of a text recognition process.

\* \* \* \* \*